Oct. 16, 1962 S. P. KINNEY ETAL 3,058,492
GOGGLE VALVE
Filed March 19, 1959 5 Sheets-Sheet 2

INVENTORS
Selwyne P. Kinney
Hugh B. Carr
BY
Christy, Parmelee, Strickland
ATTORNEYS Oct. 16, 1962    S. P. KINNEY ETAL    3,058,492
GOGGLE VALVE
Filed March 19, 1959    5 Sheets-Sheet 3
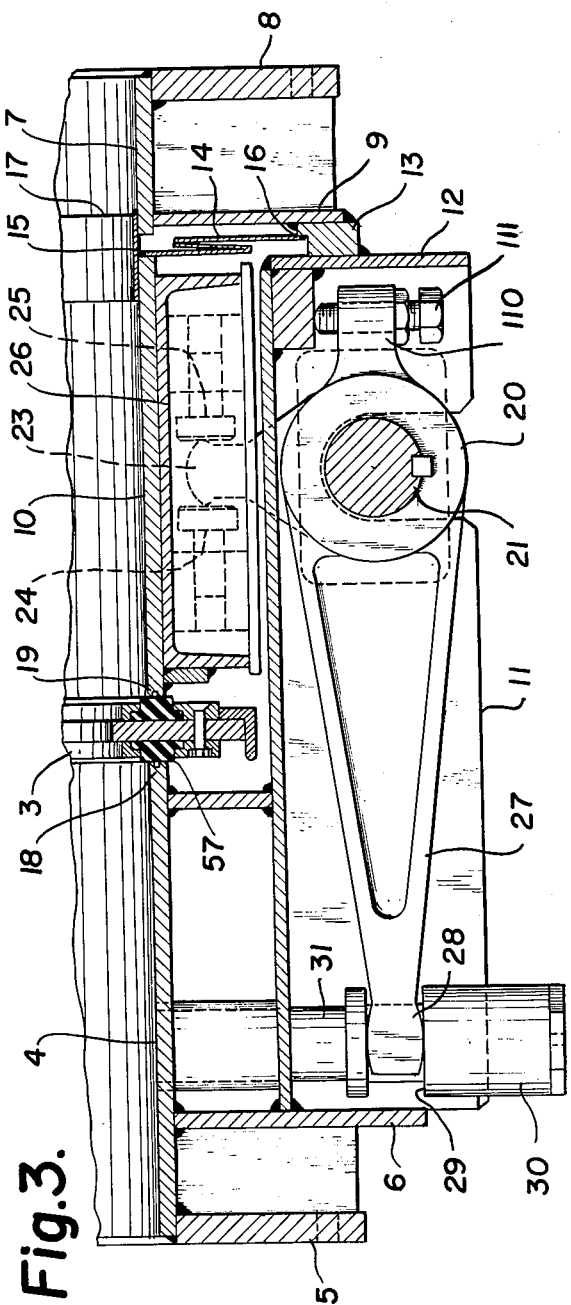
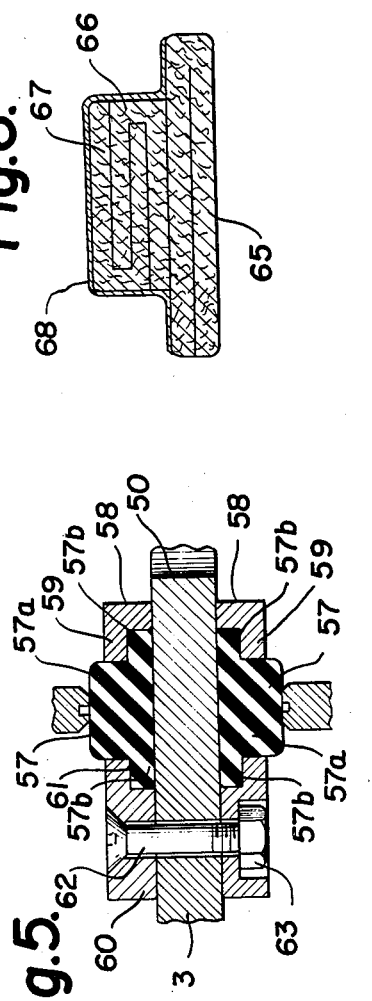
INVENTORS
Selwyne P. Kinney
BY Hugh B. Carr
Christy, Parmelee & Strickland
ATTORNEYS Oct. 16, 1962 S. P. KINNEY ETAL 3,058,492
GOGGLE VALVE
Filed March 19, 1959 5 Sheets-Sheet 4
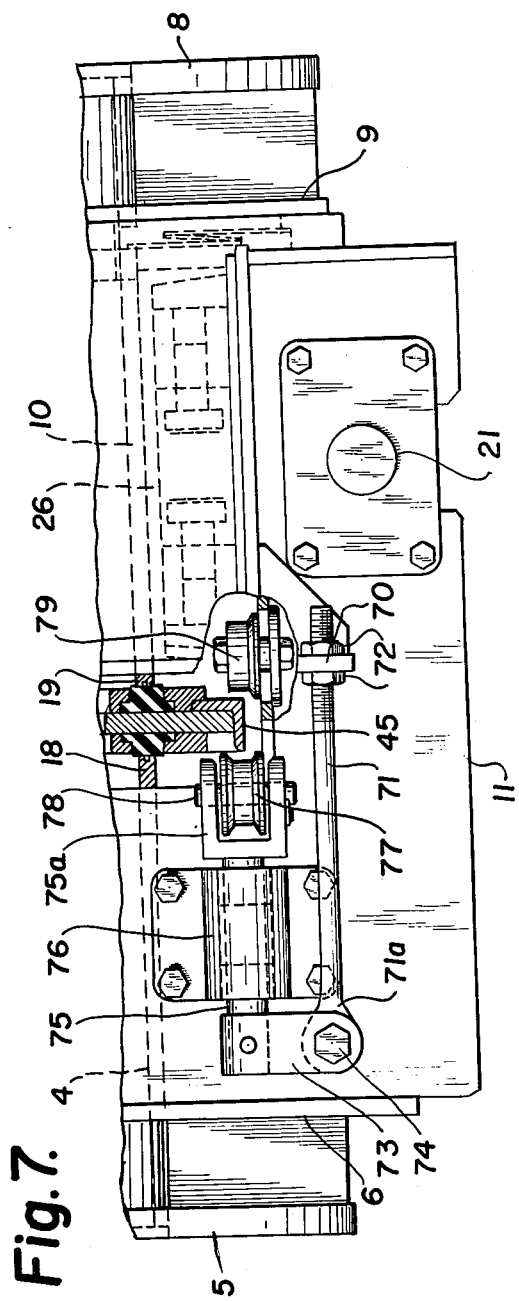
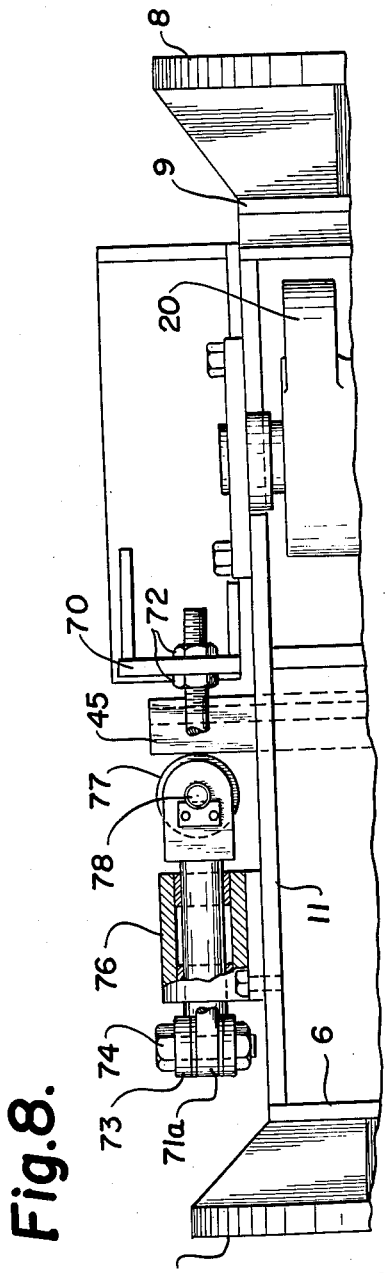
INVENTORS
Selwyne P. Kinney
Hugh B. Carr
BY
Christy, Parmelee & Strickland
ATTORNEYS

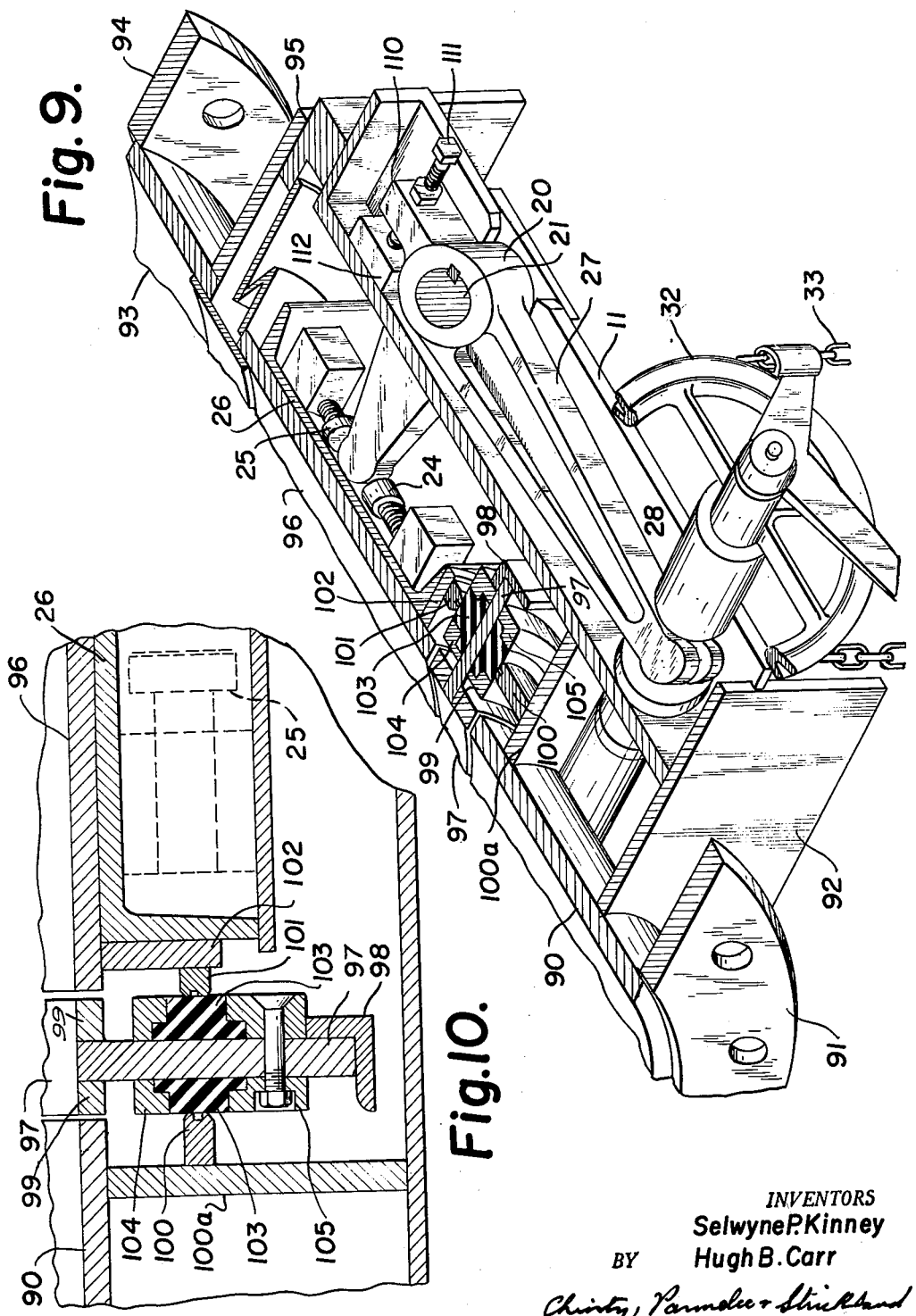

United States Patent Office 3,058,492
Patented Oct. 16, 1962

3,058,492
GOGGLE VALVE
Selwyne P. Kinney, Pittsburgh, and Hugh B. Carr, Carnegie, Pa., assignors to S. P. Kinney Engineers, Inc., Carnegie, Pa., a corporation of Pennsylvania
Filed Mar. 19, 1959, Ser. No. 800,436
6 Claims. (Cl. 138—94.3)

This invention is for an improvement in valves, and more particularly to that type of large valve used industrially and known generally as a goggle valve.

Valves of the type to which this invention relates are generally used to control the flow of gases through large ducts, as in the operation of blast furnaces. As commonly constructed, such valves have a vertically movable plate which, in its lower position, has an orifice therethrough that is very nearly the diameter of the conduit, and which in its raised position completely obstructs the flow of gases. It has no intermediate range. The plate therefore has a large circular opening at its upper end which is encircled on each face by a seating ring, and at its lower end it is imperforate, but has circular sealing rings on each face corresponding in diameter to the rings around the opening. The plate is provided with means for raising and lowering it, while the valve body provides a guideway in which the plate moves. The valve plate moves between a fixed section of the valve body and another section movable axially of the valve body normal to the valve plate. When the valve is open or closed, the movable section presses against the sealing rings on one surface of the valve plate and presses the sealing rings on the opposite face of the valve plate against the fixed section of the valve body. To move the valve plate the movable section is backed away from the valve plate. It is important that the valve be tightly sealed in either of its two positions, since it is commonly used with explosive or poisonous gases.

Valves of this type are often used where the gases carry particles of dust and dirt at high velocity. This is very destructive to the copper sealing rings that have heretofore been used on the valve plate. It is very difficult to repair such seats once they have been damaged, and dressing the valve seats when they have become damaged generally requires taking the valve out of service to secure access to the rings for machining.

An important object of the present invention is to provide sealing rings or gaskets on the valve plate which will resist the impingement and abrasion of dust and dirt, and which may be easily replaced while the valve is in service.

A further important object of our invention is to provide a positive mechanism for loosening the valve plate if it has become stuck, and also provide for guiding the valve plate in such manner that the seating rings cannot be damaged by the movement of the plate from one position to the other. A further object of our invention is to provide a valve of this kind in which the sealing surfaces are entirely out of the direct flow of gases through the valve, so that dust or grit cannot impinge at high velocity against the sealing rings.

These and other objects and advantages are secured by our invention, which may be more fully understood by reference to the accompanying drawings, in which:

FIG. 3 is a transverse horizontal section on a larger scale through one side of the valve, the view being in substantially the plane of line III—III of FIG. 1;

FIG. 5 is a fragmentary section on a large scale in substantially the plane of line V—V of FIG. 4;

FIG. 6 is a detail transverse section through one form of sealing gasket removed from the valve plate and showing the laminar construction thereof;

FIG. 7 is a fragmentary view partly in horizontal section and partly in elevation showing one of the valve plate releasing units;

FIG. 8 is a side view partly in section, of the unit shown in FIG. 7;

FIG. 9 is a fragmentary perspective view in horizontal section showing a modified construction; and FIG. 10 is a frgamentary horizontal section on a larger scale than FIG. 9 of the same modification.

Figure 1:
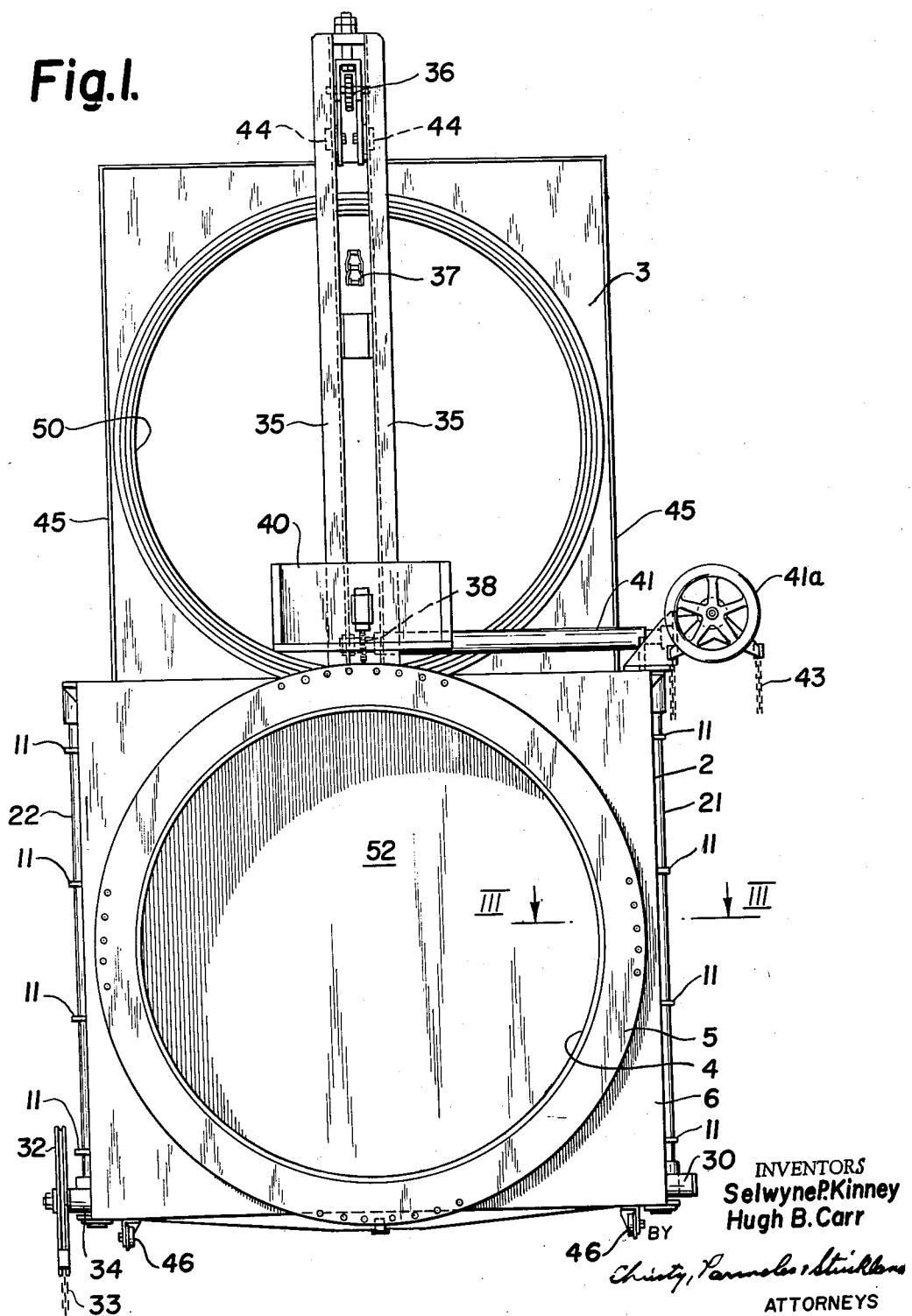
FIG. 1 is a front elevation of a goggle valve embodying the invention.
Figure 2:
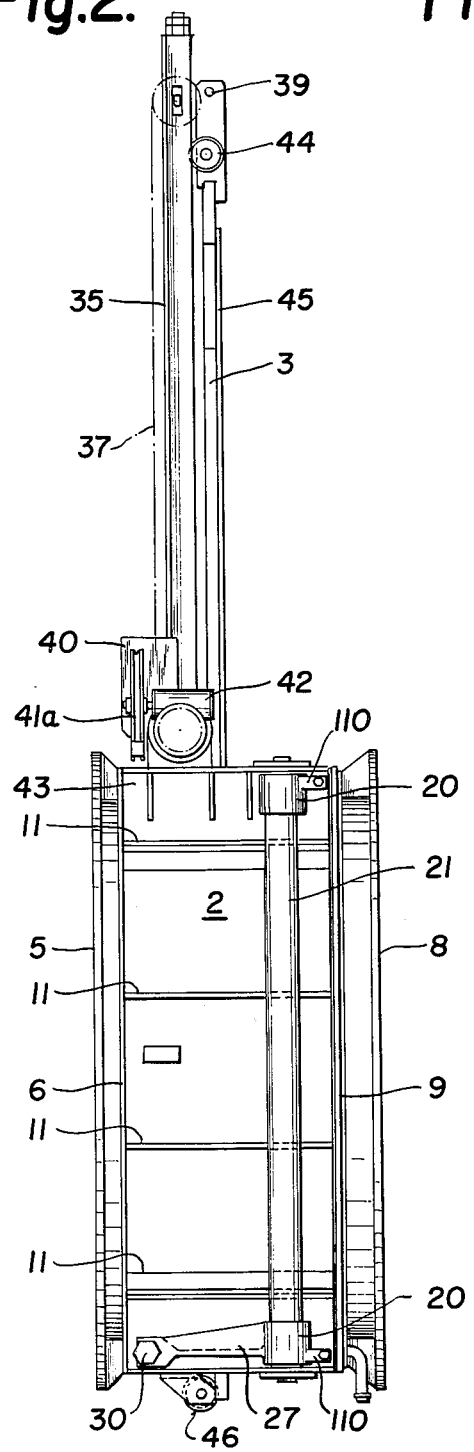
FIG. 2 is a side elevation thereof.

Referring to the drawings, and first to FIGS. 1 and 2, the valve is shown in the closed position, that is, with the valve plate raised so that the solid area of the valve plate obstructs flow of gas through the valve. The valve comprises a body, designated generally as 2, and 3 designates the valve plate.

The construction of the body 2 may be best understood by reference to FIGS. 1, 2 and 3. It is comprised of three tubular sections in end-to-end relation. The first of these is a large circular pipe member 4 with a flange 5 at its outer end by which it may be bolted to the confronting flange of the pipe section to which it is to be joined, only a few of the bolt holes for this purpose being shown. This tubular body section passes through a square plate 6 spaced inwardly from the bolt flange 5. At the opposite end of the body is a relatively shorter pipe section 7 with a bolt flange 8 at its outer end for joining the valve body into the other end of the pipe line or section in which the valve is to be located. This section 7 also passes through a square plate 9 spaced inwardly from the flange. Between the sections 4 and 7 there is a third tubular pipe section 10 of the same diameter as sections 4 and 7, and its ends are spaced from both these sections. The valve plate 3 is located between the inner end of section 4 and the end of section 10. Section 4 is rigidly connected to section 7 by enclosing plates 11 at each side of the structure welded to the inner face of the square plate 6 and extend parallel with the axis of the valve in spaced relation to the tubular sections 4 and 10, reaching almost to the square plate 9 on the opposite end section 7. These plates 11 have their inner ends welded to a flange plate 12, and a solid filler strip 13 is interposed between the flange plate 12 and the square plate 9. The several plates 6, 9 and 11 form a box-like enclosure about the several tubular sections 4, 7 and 10, and as above pointed out, these plates 11, together with flange plate 12 and filler strip 13, hold the two end sections of the valve body in fixed spaced relation. There is a flexible stainless steel bellows 14, best shown in FIG. 3, attached to one end of the tubular section 10 at 15, and attached to the filler strip 13 at 16. This bellows forms a gas-tight seal that prevents any gas from escaping from the passageway through the valve into the atmosphere, but at the same time is flexible so that the section 10 can move back and forth in a longitudinal direction relative to the sections 4 and 7. A thin metal strip 17 is welded to the inner face of the section 7 at its inner end, and it laps over the space between the tubular section 7 and the tubular section 10, and rests on the inner face of the tubular section 10. This prevents dust or solids contained in the gas traveling through the valve from escaping between the confronting ends of the sections 7 and 10 and protects the diaphragm or bellows 14 from direct impingement by any gases passing through the valve. The diaphragm or bellows 14 is circular where it is secured to the valve body 10, and square where it is welded to member 13, and extends entirely around the valve body. The band 17 is also a circular hoop inside the valve body.

The inner end of the tubular valve body section 4 is shaped as indicated at 18 to form a seat that cooperates with a sealing or seating ring, hereinafter to be described, carried on the valve plate. The confronting end of the tubular member 10 is likewise shaped as indicated at 19 to engage a similar sealing ring on the opposite side of the opposite face of the valve plate 3. The arrangement is such that when it is desired to shift the valve plate 3 from one position to the other, the section 10 is moved to the right as viewed in FIG. 3, so that the seat 19 ceases to press against the sealing ring on the valve plate 3 and the pressure of the sealing ring on the opposite face of the valve plate against the valve seat 18 is also relieved. Hence the valve plate may then be moved up and down without interference from the valve seats 18 and 19. However, when the shifting of the valve plate has been accomplished, the section 10 is moved to the left as viewed in FIG. 3. The packing rings or gaskets on the valve plate 3 are then confined between the two valve seats 18 and 19 to make a gas-tight seal.

The movement of the section 10 of the valve body back and forth as above described is accomplished by means of four cranks designated generally as 20. Two of these cranks are on a vertical shaft 21 at one side of the valve body, and two of them are on a similar vertical shaft 22 at the opposite side of the valve body. Each crank 20 has a short arm 23 that is positioned between two adjustable abutments 24 and 25 carried in a frame structure 26 rigidly attached to the section 10, the arrangement being such that when the extension 23 of the crank is moved arcuately in either direction from the position shown in FIG. 3, it will press against one of the abutments 24 or 25 to move the member 10 in one direction or the other. Four cranks are used so as to equalize and distribute the forces for moving the section 10. The cranks at the bottom of the shaft 22 have a long arm 27 terminating in a fork 28, this fork embracing a groove 29 in a collar 30 as shown in FIG. 3. The collars 30 are carried on a transverse clamping shaft 31 that extends across the bottom of the valve body, and which may be rotated either by a motor or by a hand wheel. In the drawings there is shown a hand wheel 32 over which passes an operating chain 33 for rotating the hand wheel, this wheel transmitting motion through a reducing gear 34 to the shaft 31. The particular construction of the shaft forms no part of the present invention, but the arrangement is such that threads on the shaft cause the collars 30 at each end of the shaft to move in opposite directions along the shaft at the same rate. Such movement of the collars 30 along the shaft moves the crank arms 27 at opposite sides of the valve body in opposite directions. This in turn rotates the shafts 21 and 22. All four crank arms 23 are thereby caused to move simultaneously to move the section 10 in one direction or the other as above explained. For the most part, the structure as heretofore described does not differ substantially, except as to certain minor improvements, from goggle valves heretofore constructed.

Extending upwardly from the top of the valve body is a mast formed of parallel rails 35 having a sprocket sheave 36 in the top. A sprocket chain 37, indicated for purpose of illustration and clarity only by dot-and-dash lines in FIG. 2, and a fragment only of which is shown in FIG. 1, passes over this sheave and over a second sheave 38 at the bottom of the mast. The top of the gate or valve plate 3 is provided with lifting eyes 39 which are connected to this chain, while there is a counterweight 40 attached to the chain, the arrangement being such that as the valve gate moves up, the counterweight moves down. The lower sprocket 38 may be driven by a motor or by hand. In the drawings we have shown the sprocket 38 mounted on a shaft 41 which is driven from a chain wheel 41a through a reducing gear 42, the chain wheel having an operating chain 43 passing thereover for turning the hand wheel. Frequently these valves are located some distance above ground, and for this reason operating chains such as 43 and 33 are used for operating the shafts 41 and 31 respectively.

The valve plate 3 has rollers 44 near the top that ride on the vertical rails 35, and at each side of the plate there is an angle or rail 45. We have shown rollers 46 on the bottom of the valve housing which are positioned to bear against the flanges at each side of the valve plate, but which are not necessary where the mechanism shown in FIGS. 7 and 8 and hereinafter more fully described are used.

Figure 4:
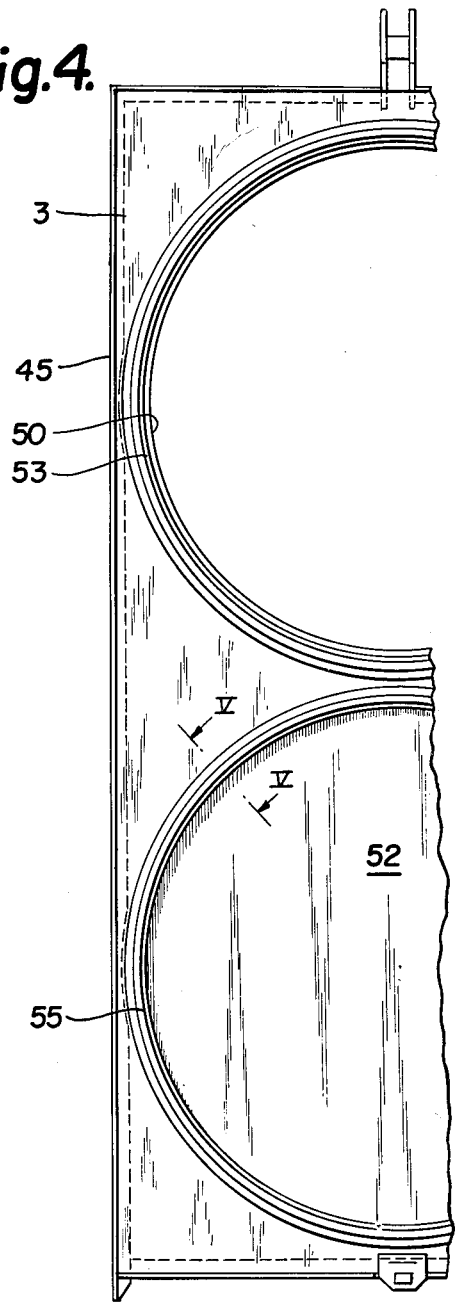
FIG. 4 is a front elevation of the valve plate removed from the valve body.

According to the present invention the plate is provided with four sealing rings or gaskets which are of a compressible nature. These sealing rings are all of like construction. The valve plate 3 has an open port 50 at the top which is of a diameter equal to the diameter of the passageway formed through the valve body by the tubular sections 4, 7 and 10. The lower end of the plate has a circular closed area designated 52. The opening 50 and the area 52 are encircled by the packing rings. One sealing ring 53 is on one side of the plate 3 around the port 50, and there is a second sealing ring of like construction around the opening 50 on the opposite side of the plate. Similarly the solid area 52 is surrounded on one face by a packing ring 55 and there is a similarly located packing ring on the opposite face of the plate. The plate removed from the valve body is shown in FIG. 4. Each of the packing rings 53 and 55 is of like construction. FIG. 5 is a detail showing the construction of these packing rings. Each packing ring comprises a seating band of a resilient or compressible nature designated generally as 57, and it may be formed from laminated asbestos fabric, laminated woven glass fabric, or composite rubber and duck material, or some similar reinforced yieldable material, the nature of the material depending somewhat on the use to which the valve is put, higher temperature gases requiring more heat-resistant seating rings.

Rubber may not be used with high temperature gases. The material which we have found eminently satisfactory with relatively hot gases is asbestos, and woven wire impregnated with silicone resin that forms a semi-resilient gasket, resistant to heat, and from which dust and grit carried by the gases rebound with little abrasive action. Temperatures encountered are ordinarily around 400° F., but may at times go as high as 800 or 900° F. These seating rings or gaskets have a central ridge portion 57a, the top of which is exposed, and a wider base portion providing oppositely-extending flanges 57b. There is a fixed retaining ring 58 continuously welded entirely around its perimeter to the face of the plate 3 around the port 50 or around the area 52 as the case may be, each of these fixed retaining rings having an overhanging flange 59 under which one of the extensions 57b of the seating ring is snugly received. Ring 58 at one side of the plate has its counterpart in direct alignment at the other side of the plate.

Spaced outwardly from the ring 58 and at the outer side of the seating ring 57 there is a removable retaining ring 60 having a flange 61 that extends over the other flange 57b of the seating ring. Bolts 62 with nuts 63 pass through the valve plate 3 and through the two rings 60 for removably holding these rings against the opposite faces of the valve plate 3.

It will thus be seen from FIG. 5 that the corresponding seating rings on opposite sides of the valve plate are retained in place by substantially identical elements. The seating rings 57 are so positioned that when the valve plate is in either the open or closed position, the proper rings will be in a direct line between the valve seats 18 and 19. Thus after the valve has been moved to one position or the other and the section 10 moved into sealing relation with the valve plate, the seat 19 will push against the sealing ring 57, and this pressure will be transmitted through the plate 3 to the opposite seating ring which will be pressed against the valve seat 18. Because of the slightly yieldable or compressible nature of the rings 57, the valve can be kept tight and the accurate machining heretofore required where copper seats welded to the face of the valve plate were used as sealing rings, is eliminated. If any seating ring needs to be replaced, it is merely necessary to remove the bolts and nuts 63, lift off the retaining rings 60, and then remove the composite seating ring and replace it with another, after which the retaining rings 60 are bolted back into place. This can be done while the valve is in use, for the reason that when the valve is closed as shown in FIGS. 1 and 2, the rings around the open port are accessible above the valve housing, and when the valve plate has been lowered, the rings around the solid area 52 will be exposed and accessible at the bottom of the valve housing. Thus the rings can be repaired and replaced without taking the valve out of service, which is a most important feature in many industrial establishments where the repair of valve seats in goggle valves may otherwise entail a complete shut-down of an important operation. There is an advantage also in having the retaining rings 58 permanently and continuously welded around the inside of the seating ring and the removable rings 60 on the outside. By reference to FIG. 5 it will be seen that the weld prevents any gas leakage between the ring 58 and the plate, the rings 58 being in the gas stream, whereas the rings 60 are on the outside of the seal where they are subjected only to atmospheric pressure, and leakage around them would not be detrimental. Unless ring 58 were continuously welded to the valve plate, there would be danger of gas leakage under or around it.

In FIG. 6 we have shown one form of resilient seating ring or gasket in which the base 65 is made of layers of wire reinforced asbestos cloth. The rib portion of the gasket which extends between the retaining flanges 59 and 61 is formed of interlayered wire reinforced asbestos cloth folded over in the manner indicated, one folded strip being designated 66, and the other folded strip being designated 67. A thin metal covering such as lead may then be applied over the top and sides of the rib, and if desired, over the top surface of the base portion 65 as well. Wire stitching is used to keep the various layers from separation. The covering layer of lead is designated 68.

These valves are often used under circumstances which cause the valve plate to adhere to the seats 18 and 19, thereby preventing the movement of the plate and causing great difficulty and possible damage to the sealing surfaces in getting it loose. For example, the valve may be in open position for a period of days or even weeks before occasion arises to close it. During this time the seats 18 and 19 will be held with great pressure against the seating rings 57 or other seating surface on the valve plate. Dust, possibly with moisture, may lodge, compact and solidify against the valve plate at the seating surfaces. The movement of the body section 10 away from the valve plate will break any seal between seat 19 and the seating surface on the valve plate against which it presses, but this does not loosen the bond between the seat 18 and the seat against which it bears.

In FIGS. 7 and 8 there is illustrated a mechanism that will positively free the valve plate so that it may be moved without difficulty. There is rigidly secured to the member 26 at each side of the valve body, preferably at each corner, a bracket 70 through which passes the threaded end of a rod 71, while nuts 72 on the rod at opposite faces of the bracket enable the rod to be adjusted relative to the bracket. The other end of the rod or link 71 terminates in an eye 71a extending between the end of a clevis 73 and connected to the clevis by a pin 74 in the form of a bolt and nut. The clevis in turn is rigidly secured to the outer end of a slide bar or rod 75. This rod is slidably supported in a guide block 76 secured to the fixed body 4. The inner end of the slide rod 75 carries a yoke 75a between the arms of which is a roller 77 on a pin 78. The roller 77 is in confronting relation to the rail 45 at the edge of the valve plate.

The arrangement is such, therefore, that when the section 10 is moved to the right as viewed in FIG. 3 out of engagement with the valve plate, bracket 70 will move with it. This motion will be transmitted through link 71 to the slide rod 75, thrusting the roller 77 against the rail 45, pushing the valve plate away from the seat 18. When the valve member 10 is moved in the opposite direction, the roller 77 is backed away from the rail 45 so as not to interfere with the proper seating and sealing of the valve. Nuts 72 on shaft 71 enable close adjustment of the relative position of the roller 77 and valve plate to be made so that no pressure will be applied by the roller to the valve plate until the seat 19 is backed well away from the plate.

A fixed guide roller 79 is secured to the plate 11 on the side of the valve plate opposite roller 77. This roller limits the movement of the plate away from the seat 18 and the plate is guided between rollers 77 and 79 when it is being operated. Even if the sealing ring should not be stuck to the valve seat, this arrangement is important in that it prevents the sealing ring or retaining rings from contacting the valve seats 18 and 19, so that neither the seating gaskets, the retaining rings nor valve seats can be damaged when the valve plate is moved, the rollers being set so that the gate has clear travel.

FIGS. 9 and 10 show a modification in which the valve body and gate are so constructed that the seats and sealing surfaces are entirely outside the passageway through the valve and protected from the direct heat and abrasive effects of dust-laden gas passing through the valve, this arrangement incidentally avoiding restriction of the passageway through the valve by reason of the necessarily slightly smaller opening in the valve gate required in the construction previously described.

In these figures 90 designates the fixed tubular section comprising one end of the valve body with a bolt-flange 91 at its outer end, and back of the flange is a plate 92, similar to the square plate 6 in FIG. 3. The other tubular end section of the valve body is designated 93 with a bolt-flange 94 at its outer end, and it has a plate 95 attached thereto spaced inwardly from the bolt-flange similar to the plate 9 of FIG. 3. The axially movable third tubular section of the valve body is designated 96 and is aligned between the other two sections with its ends spaced therefrom. The valve gate is designated 97, with a side rail 98 up each edge.

The valve areas, whether open or closed, are each defined by a circular flange 99 projecting from each face of the plate in alignment with the tubular sections 90, 93 and 96. In FIGS. 9 and 10 the circular flange is illustrated around the open area through the valve plate.

The valve seats, instead of being at the ends of the tubular sections 90 and 96, as are the valve-seats 18 and 19 in the construction first described, are located outside the circular flanges. One valve seat 100 is mounted on a flange 100a surrounding the body 90, and is concentric about the inner end of tubular section 90, but in spaced relation thereto. It confronts the edge area of the valve plate outside the flange 99 and inside the edge rail 98. The annular seat 101 on the movable section 96 is mounted on a rigid flange 102 surrounding one end of the movable section 96, and is opposite the seat 100.

In this case, the compressible or resilient seating ring 103 on each face of the valve plate is confined between a fixed inner retaining ring 104 on the valve plate, corresponding to 58 in the structure first described, and a removable ring 105 corresponding to ring 60 of said first-described form, and the seating ring 103 itself is similar to ring 57. The seating rings 103 on opposite sides of the valve plate are positioned to come between the valve seats 100 and 101 and are in the marginal edges of the plate outside the flanges 99.

As shown in FIG. 10, when the valve seats 100 and 101 are pressed against the seating rings 103, the flanges 99 are spaced from the ends of the confronting ends of the tubular sections 90 and 96, leaving adequate space for sealing the valve seats against the seating rings, but at the same time the seating rings are out of the path of gas flow through the valve. Thus they are protected from the impingement of gases directly against them and in a relatively cooler region. This same arrangement may of course be used where the seating rings are metal surfaces instead of gaskets, since it would protect metal seats also to be so disposed.

Since the mechanism for effecting movement of the movable section of the valve, i.e., 10 in FIG. 3, or 96 in FIGS. 9 and 10, is effective through a leverage capable of exerting a great deal of pressure on the sealing rings, the cranks 20 may each have an extension 110 thereon, as shown in FIGS. 3 and 9, through which passes an adjustable set screw 111 that strikes an abutment 112 on the outside of the valve housing. As the valve section 10 or 96 moves into seating position, the inner end of the set screw approaches the abutment and is adjusted so that when an effective seal has been made, further movement of the crank arm is prevented. This prevents the composition sealing ring from being crushed by excessive pressure.

Except where otherwise indicated, FIGS. 9 and 10 correspond in construction to FIGS. 1 to 8, and similar reference numerals have been used. In FIGS. 9 and 10, for clarity of illustration, we have not shown the positive valve plate release mechanism shown particularly in FIGS. 7 and 8, but such mechanisms can also be desirably used with the construction shown in FIGS. 9 and 10.

The valve as described is of the general type disclosed in prior Patent No. 2,299,124, but the present invention enables compressible gaskets to be used on the valve plate, eliminating the need for accurately machined seating surfaces and providing protection against the rings being subjected to excessive pressure. Also, by reason of the rollers 77 for moving the valve plate clear of the inner end of the fixed section 4 when the movable section 10 is withdrawn from sealing relation with the valve plate, protection is provided against damages to the seating or sealing rings or surfaces due to sticking or scraping of the rings on the seat at the end of member 4. The gaskets can be replaced without taking the valve out of service, and the continuous weld holding retaining rings 58 on the valve plates prevents leakage of gas under these rings. The bellows 14 is formed of at least three leaves, as shown, with one leaf having its inner edge continuously welded to the end of member 10, the second leaf having its outer edge continuously welded to the fixed member 13 on tubular section 7, and the third leaf hermetically joining the free edges of the other two. These leaves are of thin flexible stainless steel or other heat-resistant metal which may be flexed. This bellows will permit indefinite flexing in the operation of the valve without damage or excessive stress, while the shield 17 excludes dirt from the bellows, but does not itself need to be flexed. Moreover, the seating gaskets can be effectively protected where the construction shown in FIGS. 9 and 10 is employed.

These and other advantages will be apparent to those skilled in the art. It will be understood that various changes and modifications may be made in the construction and arrangement of parts within the scope of our invention.

We claim:

1. A goggle valve of the type having a body with a first fixed tubular section and a second tubular section movable axially toward and away from the first, a valve plate having a port area at one end and a solid area at the other end movable transversely of the axis of the two tubular sections between the confronting ends of the sections, each of said plate areas having a sealing ring encircling the same on each face of the valve plate, valve seats on the said fixed and movable tubular sections adapted to engage the sealing rings about that area of the valve plate which is disposed between the two sections and make sealing contact therewith when the movable tubular section is moved axially toward the fixed tubular section, means for effecting transverse movement of the valve plate, other separate means for effecting longitudinal movement of the movable tubular section and means connected with the movable tubular section and movable therewith for exerting pressure against the valve plate in the direction of movement of the tubular section when the latter is moved axially in a direction away from the fixed tubular section, whereby any seal between the fixed tubular section and the plate may be broken before the valve plate is moved transversely of the tubular section.

2. A goggle valve as defined in claim 1 in which the valve body includes a third tubular section fixed with reference to the first, the movable section being between the two fixed sections, a flexible gas-tight bellows having at least three leaves having the inner edge of one leaf attached to the movable section, the outer edge of another leaf attached to the third fixed section and a third leaf joining the outer edge of the first-named leaf and the inner edge of the second-named leaf, said leaves being formed of resilient metal and being disposed outside the passageway formed by the tubular sections, and a thin protecting annular shield welded to the inner surface of the third section and projecting in an axial direction beyond the end of said third section into the movable section and being in the form of a circular band spanning the space between the movable section and the third section and telescopically fitted into the end of the movable section.

3. A goggle valve of the type having a body with a fixed tubular section and a second tubular section movable axially toward and away from the first, a valve plate having a port area at one end and a solid area at the other end movable transversely of the axis of the two tubular sections between the confronting ends of the sections, each of said plate areas having a sealing ring encircling the same on each face of the plate, valve seats on the fixed and movable tubular sections adapted to engage the sealing rings about that area of the valve plate which is disposed between the two sections and make sealing contact therewith when the movable tubular section is moved axially toward the fixed one, means for effecting transverse movement of the valve plate, other separate means for effecting longitudinal movement of the movable tubular section, a roller movable on the fixed section for movement longitudinally of the fixed section thereof into and out of engagement with the valve plate, and means connecting the movable section and movably mounted roller for thrusting the roller against the valve plate to urge the valve plate clear of the fixed section when the movable section is moved in a direction away from the valve plate, whereby any seal between the fixed section and the plate may be broken before the plate is moved transversely of the tubular sections.

4. A goggle valve of the type having a body with a fixed tubular section and a second tubular section movable axially toward and away from the first, a valve plate having a port area at one end and a solid area at the other end movable transversely of the axis of the two tubular sections between the confronting ends of the sections, each of said plate areas having a sealing ring encircling the same on each face of the plate, valve seats on the fixed and movable tubular sections adapted to engage the sealing rings about that area of the valve plate which is disposed between the two sections and make sealing contact therewith when the movable tubular section is moved ring which will be pressed against the valve seat 18. Because of the slightly yieldable or compressible nature of the rings 57, the valve can be kept tight and the accurate machining heretofore required where copper seats welded to the face of the valve plate were used as sealing rings, is eliminated. If any seating ring needs to be replaced, it is merely necessary to remove the bolts and nuts 63, lift off the retaining rings 60, and then remove the composite seating ring and replace it with another, after which the retaining rings 60 are bolted back into place. This can be done while the valve is in use, for the reason that when the valve is closed as shown in FIGS. 1 and 2, the rings around the open port are accessible above the valve housing, and when the valve plate has been lowered, the rings around the solid area 52 will be exposed and accessible at the bottom of the valve housing. Thus the rings can be repaired and replaced without taking the valve out of service, which is a most important feature in many industrial establishments where the repair of valve seats in goggle valves may otherwise entail a complete shut-down of an important operation. There is an advantage also in having the retaining rings 58 permanently and continuously welded around the inside of the seating ring and the removable rings 60 on the outside. By reference to FIG. 5 it will be seen that the weld prevents any gas leakage between the ring 58 and the plate, the rings 58 being in the gas stream, whereas the rings 60 are on the outside of the seal where they are subjected only to atmospheric pressure, and leakage around them would not be detrimental. Unless ring 58 were continuously welded to the valve plate, there would be danger of gas leakage under or around it.

In FIG. 6 we have shown one form of resilient seating ring or gasket in which the base 65 is made of layers of wire reinforced asbestos cloth. The rib portion of the gasket which extends between the retaining flanges 59 and 61 is formed of interlayered wire reinforced asbestos cloth folded over in the manner indicated, one folded strip being designated 66, and the other folded strip being designated 67. A thin metal covering such as lead may then be applied over the top and sides of the rib, and if desired, over the top surface of the base portion 65 as well. Wire stitching is used to keep the various layers from separation. The covering layer of lead is designated 68.

These valves are often used under circumstances which cause the valve plate to adhere to the seats 18 and 19, thereby preventing the movement of the plate and causing great difficulty and possible damage to the sealing surfaces in getting it loose. For example, the valve may be in open position for a period of days or even weeks before occasion arises to close it. During this time the seats 18 and 19 will be held with great pressure against the seating rings 57 or other seating surface on the valve plate. Dust, possibly with moisture, may lodge, compact and solidify against the valve plate at the seating surfaces. The movement of the body section 10 away from the valve plate will break any seal between seat 19 and the seating surface on the valve plate against which it presses, but this does not loosen the bond between the seat 18 and the seat against which it bears.

In FIGS. 7 and 8 there is illustrated a mechanism that will positively free the valve plate so that it may be moved without difficulty. There is rigidly secured to the member 26 at each side of the valve body, preferably at each corner, a bracket 70 through which passes the threaded end of a rod 71, while nuts 72 on the rod at opposite faces of the bracket enable the rod to be adjusted relative to the bracket. The other end of the rod or link 71 terminates in an eye 71a extending between the end of a clevis 73 and connected to the clevis by a pin 74 in the form of a bolt and nut. The clevis in turn is rigidly secured to the outer end of a slide bar or rod 75. This rod is slidably supported in a guide block 76 secured to the fixed body 4. The inner end of the slide rod 75 carries a yoke 75a between the arms of which is a roller 77 on a pin 78. The roller 77 is in confronting relation to the rail 45 at the edge of the valve plate.

The arrangement is such, therefore, that when the section 10 is moved to the right as viewed in FIG. 3 out of engagement with the valve plate, bracket 70 will move with it. This motion will be transmitted through link 71 to the slide rod 75, thrusting the roller 77 against the rail 45, pushing the valve plate away from the seat 18. When the valve member 10 is moved in the opposite direction, the roller 77 is backed away from the rail 45 so as not to interfere with the proper seating and sealing of the valve. Nuts 72 on shaft 71 enable close adjustment of the relative position of the roller 77 and valve plate to be made so that no pressure will be applied by the roller to the valve plate until the seat 19 is backed well away from the plate.

A fixed guide roller 79 is secured to the plate 11 on the side of the valve plate opposite roller 77. This roller limits the movement of the plate away from the seat 18 and the plate is guided between rollers 77 and 79 when it is being operated. Even if the sealing ring should not be stuck to the valve seat, this arrangement is important in that it prevents the sealing ring or retaining rings from contacting the valve seats 18 and 19, so that neither the seating gaskets, the retaining rings nor valve seats can be damaged when the valve plate is moved, the rollers being set so that the gate has clear travel.

FIGS. 9 and 10 show a modification in which the valve body and gate are so constructed that the seats and sealing surfaces are entirely outside the passageway through the valve and protected from the direct heat and abrasive effects of dust-laden gas passing through the valve, this arrangement incidentally avoiding restriction of the passageway through the valve by reason of the necessarily slightly smaller opening in the valve gate required in the construction previously described.

In these figures 90 designates the fixed tubular section comprising one end of the valve body with a bolt-flange 91 at its outer end, and back of the flange is a plate 92, similar to the square plate 6 in FIG. 3. The other tubular end section of the valve body is designated 93 with a bolt-flange 94 at its outer end, and it has a plate 95 attached thereto spaced inwardly from the bolt-flange similar to the plate 9 of FIG. 3. The axially movable third tubular section of the valve body is designated 96 and is aligned between the other two sections with its ends spaced therefrom. The valve gate is designated 97, with a side rail 98 up each edge.

The valve areas, whether open or closed, are each defined by a circular flange 99 projecting from each face of the plate in alignment with the tubular sections 90, 93 and 96. In FIGS. 9 and 10 the circular flange is illustrated around the open area through the valve plate.

The valve seats, instead of being at the ends of the tubular sections 90 and 96, as are the valve-seats 18 and 19 in the construction first described, are located outside the circular flanges. One valve seat 100 is mounted on a flange 100a surrounding the body 90, and is concentric about the inner end of tubular section 90, but in spaced relation thereto. It confronts the edge area of the valve plate outside the flange 99 and inside the edge rail 98. The annular seat 101 on the movable section 96 is mounted on a rigid flange 102 surrounding one end of the movable section 96, and is opposite the seat 100.

In this case, the compressible or resilient seating ring 103 on each face of the valve plate is confined between a fixed inner retaining ring 104 on the valve plate, corresponding to 58 in the structure first described, and a removable ring 105 corresponding to ring 60 of said first-described form, and the seating ring 103 itself is similar to ring 57. The seating rings 103 on opposite sides of the valve plate are positioned to come between the valve seats 100 and 101 and are in the marginal edges of the plate outside the flanges 99.

As shown in FIG. 10, when the valve seats 100 and 101 are pressed against the seating rings 103, the flanges 99 are spaced from the ends of the confronting ends of the tubular sections 90 and 96, leaving adequate space for sealing the valve seats against the seating rings, but at the same time the seating rings are out of the path of gas flow through the valve. Thus they are protected from the impingement of gases directly against them and in a relatively cooler region. This same arrangement may of course be used where the seating rings are metal surfaces instead of gaskets, since it would protect metal seats also to be so disposed.

Since the mechanism for effecting movement of the movable section of the valve, i.e., 10 in FIG. 3, or 96 in FIGS. 9 and 10, is effective through a leverage capable of exerting a great deal of pressure on the sealing rings, the cranks 20 may each have an extension 110 thereon, as shown in FIGS. 3 and 9, through which passes an adjustable set screw 111 that strikes an abutment 112 on the outside of the valve housing. As the valve section 10 or 96 moves into seating position, the inner end of the set screw approaches the abutment and is adjusted so that when an effective seal has been made, further movement of the crank arm is prevented. This prevents the composition sealing ring from being crushed by excessive pressure.

Except where otherwise indicated, FIGS. 9 and 10 correspond in construction to FIGS. 1 to 8, and similar reference numerals have been used. In FIGS. 9 and 10, for clarity of illustration, we have not shown the positive valve plate release mechanism shown particularly in FIGS. 7 and 8, but such mechanisms can also be desirably used with the construction shown in FIGS. 9 and 10.

The valve as described is of the general type disclosed in prior Patent No. 2,299,124, but the present invention enables compressible gaskets to be used on the valve plate, eliminating the need for accurately machined seating surfaces and providing protection against the rings being subjected to excessive pressure. Also, by reason of the rollers 77 for moving the valve plate clear of the inner end of the fixed section 4 when the movable section 10 is withdrawn from sealing relation with the valve plate, protection is provided against damages to the seating or sealing rings or surfaces due to sticking or scraping of the rings on the seat at the end of member 4. The gaskets can be replaced without taking the valve out of service, and the continuous weld holding retaining rings 53 on the valve plates prevents leakage of gas under these rings. The bellows 14 is formed of at least three leaves, as shown, with one leaf having its inner edge continuously welded to the end of member 10, the second leaf having its outer edge continuously welded to the fixed member 13 on tubular section 7, and the third leaf hermetically joining the free edges of the other two. These leaves are of thin flexible stainless steel or other heat-resistant metal which may be flexed. This bellows will permit indefinite flexing in the operation of the valve without damage or excessive stress, while the shield 17 excludes dirt from the bellows, but does not itself need to be flexed. Moreover, the seating gaskets can be effectively protected where the construction shown in FIGS. 9 and 10 is employed.

These and other advantages will be apparent to those skilled in the art. It will be understood that various changes and modifications may be made in the construction and arrangement of parts within the scope of our invention.

We claim:

1. A goggle valve of the type having a body with a first fixed tubular section and a second tubular section movable axially toward and away from the first, a valve plate having a port area at one end and a solid area at the other end movable transversely of the axis of the two tubular sections between the confronting ends of the sections, each of said plate areas having a sealing ring encircling the same on each face of the valve plate, valve seats on the said fixed and movable tubular sections adapted to engage the sealing rings about that area of the valve plate which is disposed between the two sections and make sealing contact therewith when the movable tubular section is moved axially toward the fixed tubular section, means for effecting transverse movement of the valve plate, other separate means for effecting longitudinal movement of the movable tubular section and means connected with the movable tubular section and movable therewith for exerting pressure against the valve plate in the direction of movement of the tubular section when the latter is moved axially in a direction away from the fixed tubular section, whereby any seal between the fixed tubular section and the plate may be broken before the valve plate is moved transversely of the tubular section.

2. A goggle valve as defined in claim 1 in which the valve body includes a third tubular section fixed with reference to the first, the movable section being between the two fixed sections, a flexible gas-tight bellows having at least three leaves having the inner edge of one leaf attached to the movable section, the outer edge of another leaf attached to the third fixed section and a third leaf joining the outer edge of the first-named leaf and the inner edge of the second-named leaf, said leaves being formed of resilient metal and being disposed outside the passageway formed by the tubular sections, and a thin protecting annular shield welded to the inner surface of the third section and projecting in an axial direction beyond the end of said third section into the movable section and being in the form of a circular band spanning the space between the movable section and the third section and telescopically fitted into the end of the movable section.

3. A goggle valve of the type having a body with a fixed tubular section and a second tubular section movable axially toward and away from the first, a valve plate having a port area at one end and a solid area at the other end movable transversely of the axis of the two tubular sections between the confronting ends of the sections, each of said plate areas having a sealing ring encircling the same on each face of the plate, valve seats on the fixed and movable tubular sections adapted to engage the sealing rings about that area of the valve plate which is disposed between the two sections and make sealing contact therewith when the movable tubular section is moved axially toward the fixed one, means for effecting transverse movement of the valve plate, other separate means for effecting longitudinal movement of the movable tubular section, a roller movable on the fixed section for movement longitudinally of the fixed section thereof into and out of engagement with the valve plate, and means connecting the movable section and movably mounted roller for thrusting the roller against the valve plate to urge the valve plate clear of the fixed section when the movable section is moved in a direction away from the valve plate, whereby any seal between the fixed section and the plate may be broken before the plate is moved transversely of the tubular sections.

4. A goggle valve of the type having a body with a fixed tubular section and a second tubular section movable axially toward and away from the first, a valve plate having a port area at one end and a solid area at the other end movable transversely of the axis of the two tubular sections between the confronting ends of the sections, each of said plate areas having a sealing ring encircling the same on each face of the plate, valve seats on the fixed and movable tubular sections adapted to engage the sealing rings about that area of the valve plate which is disposed between the two sections and make sealing contact therewith when the movable tubular section is moved axially toward the fixed one, means for effecting transverse movement of the valve plate, other separate means for effecting longitudinal movement of the movable tubular section, a roller movably supported on the first section for movement longitudinally of the fixed section into and out of pressure-applying engagement with the valve plate, and means connecting the movable section and the movably supported roller for moving it in the direction of travel of the movable section to exert a thrust against the valve plate to urge the valve plate clear of the fixed section when the movable section is moved in a direction away from the valve plate, there being a relatively fixed roller at the opposite side of the valve plate from the first roller for bearing against the valve plate when it is urged away from the fixed section by the first roller.

5. A goggle valve of the type having a body with a first fixed tubular section and a second tubular section movable axially toward and away from the first, a valve plate having a port area at one end and a solid area at the other end movable transversely of the axis of the two tubular sections between the confronting ends of the sections, each of said plate areas having a sealing ring encircling the same on each face of the plate, valve seats on the fixed and movable tubular sections adapted to engage the sealing rings about that area of the valve plate which is disposed between the two said tubular sections and make sealing contact therewith when the movable tubular section is moved axially toward the fixed one, the valve seats on the fixed and movable tubular members being concentric with but spaced around the exterior of the ends of the respective tubular sections on which they are carried, the port and solid areas of the valve plate being each surrounded on each face of the valve plate by a flange normal to the surface of the plate, with the flanges around the areas being such that the flanges around one said area or the other align with the ends of the tubular sections when one area or the other of the gate is positioned between the two sections, whereby a non-obstructed axially aligned passage of uniform diameter is formed by the tubular sections and the plate flanges, the sealing rings on the plate being concentric about the flanges and of a diameter to be engaged by the valve seats of the fixed and movable sections and being shielded from the direct flow of gases through the valve by the flanges.

6. For use in a goggle valve having aligned body sections, one of which is movable axially toward and away from the other and a goggle plate with two valve areas which may be alternately moved from a position where one or the other of said areas is in sealed relation with the confronting ends of the aligned body sections, the invention comprising a goggle plate having an open valve area and a closed area which are substantially coextensive in size and located one adjacent the other within the confines of the plate, a replaceable annular sealing gasket around each area on each side of the plate, the gasket having a base that rests against the plate and an exposed face to engage the seats at the ends of the aligned body sections of the valve, a ring on the plate inside the gasket fixed to the plate in gas-tight relation thereto, said ring engaging the inner edge of the annular gasket, a second ring around the plate outside the gasket and removably bolted to the plate by bolts passed through the ring and the plate, the gasket being immovably held on the plate between the said inner ring and the movable outer ring whereby either gasket may be replaced on either side of a plate by moving that area of the plate wherein the gasket is to be replaced to a position from between the confronting ends of the aligned body sections.

References Cited in the file of this patent

UNITED STATES PATENTS

| | | |
|---|---|---|
| 2,299,124 | Boynton | Oct. 20, 1942 |
| 2,462,493 | Hamer | Feb. 22, 1949 |
| 2,707,494 | Westling | May 3, 1955 |
| 2,800,926 | Handley | July 30, 1957 |
| 2,946,349 | Hamer | July 26, 1960 |